(12) United States Patent
Jin et al.

(10) Patent No.: US 8,495,154 B2
(45) Date of Patent: Jul. 23, 2013

(54) CONTENT USAGE TRACKING IN SUPERDISTRIBUTION

(75) Inventors: Hongxia Jin, San Jose, CA (US); Di Ma, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 12/693,333

(22) Filed: Jan. 25, 2010

(65) Prior Publication Data
US 2011/0185023 A1    Jul. 28, 2011

(51) Int. Cl.
*G06F 15/16* (2006.01)
(52) U.S. Cl.
USPC .......................................................... 709/206
(58) Field of Classification Search
None
See application file for complete search history.

(56) References Cited

U.S. PATENT DOCUMENTS

| | | | |
|---|---|---|---|
| 6,516,416 B2 | 2/2003 | Gregg et al. | |
| 7,496,540 B2 | 2/2009 | Irwin et al. | |
| 2004/0148503 A1 | 7/2004 | Sidman | |
| 2005/0114683 A1* | 5/2005 | Jin et al. | 713/187 |
| 2007/0294173 A1 | 12/2007 | Levy et al. | |
| 2008/0288629 A1 | 11/2008 | Fisher et al. | |
| 2009/0006109 A1* | 1/2009 | Martinez et al. | 705/1 |

FOREIGN PATENT DOCUMENTS

| | | |
|---|---|---|
| WO | WO2008144530 | 11/2008 |
| WO | WO2008153307 | 12/2008 |

OTHER PUBLICATIONS

Roger Clarke, "Introduction to dativeillance and information privacy, and definitions of terms," https://www.anu.odu.au/people/Roger.Clarke/DV/Intro.html.
Priscilla M. Regan, "Privacy as a common good in the digital world," Information, Communication and Society, vol. 5, No. 3, 2002. p. 382-405.
D. Kristol and L. Montulli, "Rfc 2109 http state management mechanism," http://tools.letf.org/html/rfc2109.
Richard M. Smith, "The web bug faq," http://w2.eff.org/Privacy/Marketing/web_bug.html.
A. Fiat and T. Tassa, "Dynamic traitor tracing," in Advances in Cryptology—CRYPTO'99, 1999, pp. 354-371.
R. Safavi-Naini and Y. Wang, "Sequential traitor tracing," in Advances in Cryptology—CRYPT0'00, 2000.
H. Jin, J. Lotspiech, and S. Nusser, "Traitor tracing for prerecorded and recordable media," in ACM DRM'04, 2004.
M.Wu,W. Trappe, Z.Wang, and K.J.R. Liu, "Collusion resistant fingerprinting for multimedia," IEEE Signal Processing Magazine, Special Issue on Digital Rights Management, pp. 15-27, Mar. 2004.

(Continued)

*Primary Examiner* — Peling Shaw
(74) *Attorney, Agent, or Firm* — Cantor Colburn LLP (57) ABSTRACT

According to one embodiment of the present invention, a method for tracking the usage of digital content is provided. The method includes tracking the usage of at least one digital content by having a provider computer system prepare the content in an encoded format and allowing the provider computer system to distribute the content to a user computer system. The user computer system is made to generate at least one usage tracking message in response to the usage of the content by the user computer system in a uniform, fine-grained and format independent way. The user computer system is enabled to report the usage tracking message to the provider computer system. The provider computer system verifies the usage tracking message.

15 Claims, 5 Drawing Sheets

OTHER PUBLICATIONS

Z. Wang, M. Wu, W. Trappe, and K.J.R. Liu, "Group-oriented fingerprinting for multimedia forensics," EURASIP Journal on Applied Signal Processing, Special Issue on Multimedia Security and Rights Management, Nov. 2004.

G. Ateniese, R. Burns, R. Curtmola, J. Herring, L. Kissner, Z. Peterson, and D. Song, "Provable data possession at untrusted stores," in ACM CCS'07, 2007.

Jin et al. "Renewable traitor tracing: a trace-revoke-trace system for anonymous attack," in Securecom'08, 2008.

A. Juels and B. Kaliski, "Pors: proofs of retrievability for large files," in ACM CCS'07, 2007.

H. Shacham and B.Waters, "Compact proofs of retrievability," in Asiacrypt'08, 2008.

"Openssl," http://www.openssl.org.

Abie, H. et al.,A Distributed Digital Rights Management Model for Secure Information Distribution Systems, International Journal of Information Security (IJIS), Springer-Verlag,2004.

Pavlowski et al., "Digital Media and Entertainment Service Delivery Platform", MCS '05, Nov. 11, 2005, Singapore, p. 47.

Michiels et al., "Towards a Software Architecture for DRM", DRM '05, Nov. 7, 2005, Alexandria Virginia. p. 65.

* cited by examiner

CONTENT USAGE TRACKING IN SUPERDISTRIBUTION

BACKGROUND

The present invention relates to content usage tracking, and more specifically, to techniques for content usage tracking in superdistribution.

Digital contents are easy to be copied and distributed through online or through recorded media such as DVD, VCD and etc. Superdistribution is a highly efficient means of distribution because distribution is not impeded by any barriers and anyone can become a distributor. In this model, end users who have acquired content directly from content providers are allowed to forward their acquired content to other users. Compared with traditional content delivery methods, superdistribution allows digital products to be distributed to a wider range of users at a faster speed.

SUMMARY

According to one embodiment of the present invention, a method of tracking the usage of at least one digital content comprises: having a provider computer system prepare the content in an encoded format; allowing the provider computer system to distribute the content to a user computer system; enabling the user computer system to generate at least one usage tracking message in response to the usage of the content by the user computer system in a uniform, fine-grained and format independent way; making the user computer system to report the usage tracking message to the provider computer system; and ensuring that the provider computer system verifies the usage tracking message.

According to another embodiment of the present invention, a method comprises: preparing digital content in an encoded format using a provider computer system; distributing the digital content to a user computer system; generating at least one usage tracking message in response to the usage of the content by the user computer system; reporting the usage tracking message to the provider computer system; and verifying the usage tracking message.

According to a further embodiment of the present invention, a system comprises: a provider computer system including a message verification component; a user computer system including a content tracking program; digital content including a content identifier; and wherein the tracking program generates a usage tracking message that reports usage of the digital content by the user computer system and wherein the user computer system sends the usage tracking message to the provider computer system.

According to another embodiment of the present invention, a computer program product for tracking usage of digital content comprises: a computer usable medium having computer usable program code embodied therewith, the computer usable program code comprising: computer usable program code configured to: prepare digital content in an encoded format using a provider computer system; distribute the digital content to a user computer system; generate at least one usage tracking message in response to the usage of the content by the user computer system; report the usage tracking message to the provider computer system; and verify the usage tracking message.

DETAILED DESCRIPTION

Embodiments of the invention provide ways to track content usage in superdistribution.

As described above, superdistribution is a pervasive content distribution model. Content usage statistics from the wider range of users afforded by superdistribution could be used for any number of purposes including marketing, accounting, and/or loss prevention and thus have great commercial value. For example, a gaming company may be interested in knowing whether the majority of its customers play game online or offline. More online usage may suggest that people like to play games in a group. So the gaming company may be advised to develop more group games, for example.

Another example of the use of content usage statistics in superdistribution is that a content provider company may wants to know how the identical content is consumed in different platforms and/or at different geographical regions in the world. These types of statistics can help optimizing content distribution to different platforms/regions. Yet another example is that an advertisement company may want to know the number of clicks on a piece of advertisement embedded in a movie or a game. Knowing the number of clicks on the piece of advertisement not only allows the advertisement company to charge the companies shown in the commercial precisely but also lets it deduce the relationship between the type of movie viewers and the type of products (for example, people who like to watch certain kinds of movies are usually interested particular kinds of products). The latter helps the advertisement company to decide what advertising to put on and thus do more effective advertisements in the future. Hence, it is highly desirable to design a method to simply and efficiently track the usage of widely distributed digital contents. However tracking content usage under the superdistribution model poses a number of challenges since most content users have no explicit pre-established relationship with the content provider. Many end-users obtain their content through other end-users instead of directly through the content provider.

Figure 1:
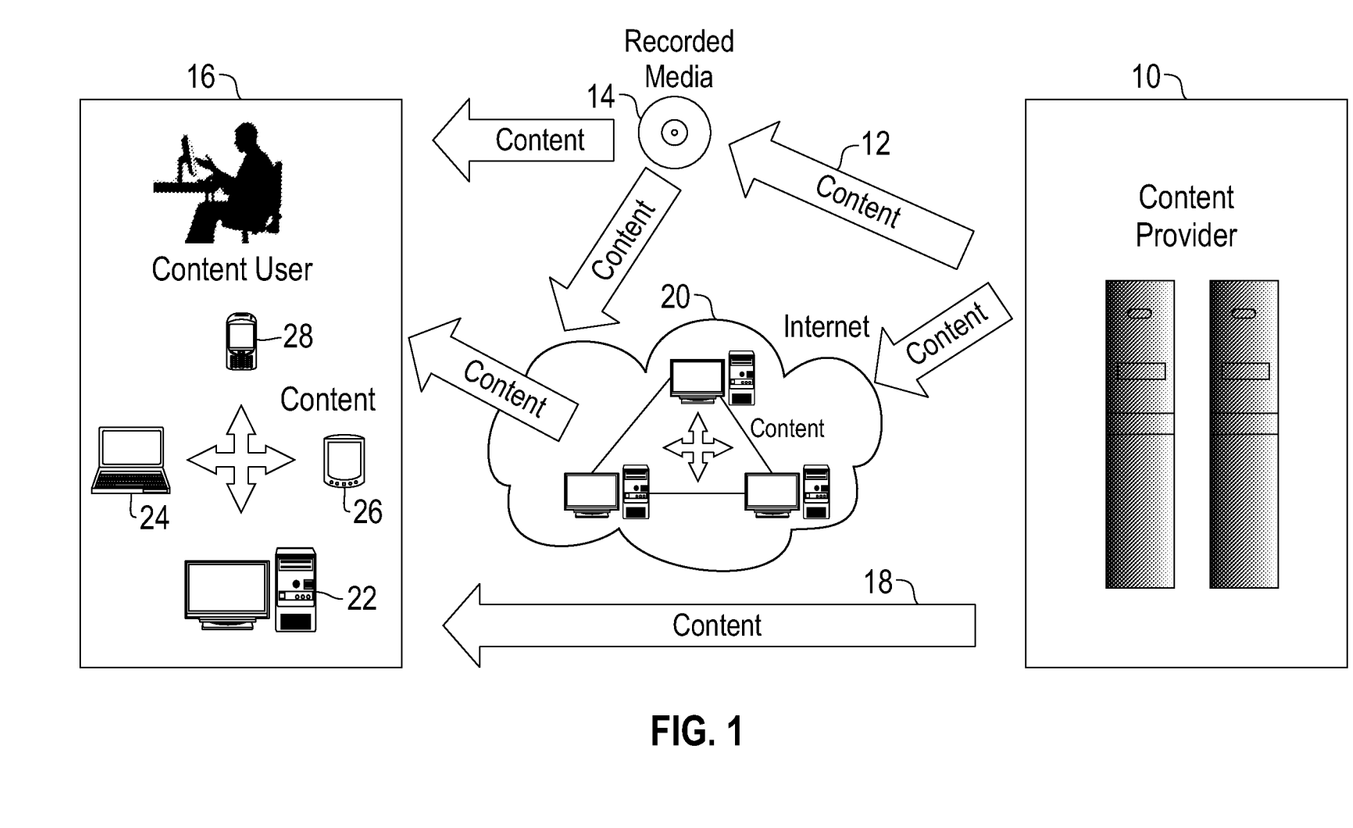
FIG. 1 shows a diagram of the distribution of digital content in a superdistribution system in accordance with an embodiment of the invention.

FIG. 1 shows the content distribution flow in the superdistribution model. A content provider (P) 10 publishes its content 12 online and/or distributes it in the form of recorded media 14. A content user (U) 16 may acquire its desired content through various ways, including by downloading it directly from the web-end 18 of P or getting a copy of the content in physical medium 14; or being forwarded through emails messages by other users, or downloading it from public areas in the Internet 20 set up by other users. As shown in FIG. 1, only users who download content directly from the web-end 18 of P may have an initial interaction with P. For the remaining users, there is no pre-established information channel between them and P. This makes the task of tracking content usage from them a very challenging job. The task of tracking is further complicated as U may transfer and play the same content among multiple of its computing devices such as desktop 22, laptop 24, PDA 26, cell phone 28, etc.

User confidentiality is always a concern associated with any tracking scheme. Information confidentiality is the interest an individual has in controlling, or at least significantly influencing, the handling of data about themselves. To allow the release of information in a controlled way, it may be desirable for users to be well informed before any tracking scheme takes place and for users to have the ability to disable the tracking program if they decide to do so. Particular ways to enforce user confidentiality may be incorporated into the various embodiments of the present invention.

Embodiments of the present invention relate to tracking schemes that track content usage in the above-described superdistribution model where most users have no pre-established information channel with the content provider. The invention includes a novel content usage tracking scheme utilizing the concept of Provable Data Possession (PDP) which is used to construct content identifiers. The content identifier generation method is very general and format independent so it can be applied to any media type such as text, audio, video, etc. The basic tracking scheme provides fine grained tracking and it can track down to different copies of the same content. The advanced tracking scheme provides more accurate tracking by imposing storage and computation cost at the client side. To the inventor's knowledge, this is the first tracking scheme which provides accurate tracking by imposing computation and storage penalty to prevent abused and malicious usage reporting. Furthermore, embodiments of the invention puts minimal burden on the provider side in preparing its content before distribution and thus allows efficient and quick content distribution.

A content usage tracking scheme was disclosed in U.S. patent application no. US20080288629. This system uses a client side tracking program to collect and report content usage to the provider. The client side tracking program generates and sends back a fingerprint of the media content to the provider. The provider identifies the content by looking for a matching of the received fingerprint with a stored fingerprint in its fingerprint database. In this scheme, both the tracking program and the content provider have to be equipped with a fingerprinting kit consisting of various fingerprinting schemes for audio, video, etc. This has certain implications. First, the client side has to have the fingerprint kit in order to generate a fingerprint. In other words, the content provider has to prepare this fingerprinting kit and also deliver this kit to the users (client), either together with the content or the content provider must pre-distribute the kit in advance. In embodiments of the present invention, the content provider does not have to deliver significant extra information in addition to content file. Second, the fingerprinting kit used in the scheme described in US20080288629 is format dependent, in that the kit contains several fingerprint algorithms/functions that fit different content formats. In embodiments of the invention, the fingerprint generation mechanisms are uniform and format-independent. Third, the scheme in US20080288629 does not provide fine-grained tracking because the underlying fingerprint scheme does not differentiate different copies of the same content. As discussed above, content providers often want to know the statistics for the same content consumed on different platforms and/or in different geographical regions. Therefore fine-grain tracking can be very desirable. Embodiments of the invention may be fine-grained to distinguish different copies for the same content. Moreover, like all the web usage tracking schemes discussed below, accurate tracking information is not guaranteed. Any malicious party who learns the fingerprint can report false usage information to the provider, since there is only one valid fingerprint associated with each content. In contrast, embodiments of the invention provide protection against false reporting of content usage. Variations of US20080288629 can be found in WO2008144530A2 which suffer the same shortcoming described herein.

There also exist Web usage tracking schemes such as HTTP cookies and web bugs. HTTP cookies, also referred to as Web cookies, tracking cookies or just cookies, are pieces of text data sent by a server to a Web client (usually a browser) when the user visits the sever. The cookie is then sent back unchanged by the client each time it accesses that server. The server identifies the user by looking at the cookie. A web bug is an object—usually in the form of an image—that is embedded in a web page or e-mail and is usually invisible to the user. When a user views the page or email, it invokes the downloading of the bug image from the server and thus notifies the server that the user is viewing the page or email. Both of these techniques rely on identifiers, such as cookie or web-bug, generated on the server side to identify web activities of a particular user. In the context of superdistribution, since there is no pre-interaction between P and U we cannot use identifiers generated on the server side. Instead, we need identifiers generated on the user side for tracking purpose. Furthermore, both techniques are designed for web usage tracking and they rely on explicit http requests from users. In the context of content usage tracking for superdistribution, it is not reasonable to require users to explicitly interact with the provider (through http) every time the user plays content. Instead, we need a client-side tracking program that reports content usage information to the provider automatically without explicit user involvement—provided the user has agreed to report its usage information to the provider. Finally, both cookies and web bugs provide inaccurate tracking information as cookies can be compromised and a web bug has no relationship with the content to be tracked.

Traitor tracing schemes and fingerprinting schemes are also not helpful in tracking usage in superdistribution. Traitor tracing schemes may build variations for the content (e.g. by embedding information to the content) and assign different variations to different users. The burned decryption keys on the devices may allow each device to decrypt only one variation of the content. Recovered pirated copies allow the link to the original users who have those decryption keys. However, user tracing and content usage tracking are two different conceptions and user tracing schemes cannot be applied directly in the application of content usage tracking. First of all, user tracing is mainly used for copyright enforcement and protection, where the identity of a pirate is needed. In content tracking, we only need to know someone did it without needing to know exactly who did it. In fact, in user tracing, once pirated copy of copyrighted digital content is found, the content itself has to be presented as forensic evidence to the tracing authority to identify the guilty user. In content usage tracking, it does not make sense to send back the content to the tracking authority. Furthermore, the number of content users in the superdistribution model is very large. Sending back content would incur a huge amount of communication overhead. Therefore user tracing schemes are inapplicable to the content tracking problem.

Embodiments of the present invention may include three phases: 1) content preparation and distribution, 2) usage tracking message generation and reporting, and 3) usage tracking message verification. The methods of the invention in phases 1 and 2 are clearly distinguished from existing schemes. In phase 1, embodiments of the invention do not require the content provider to deliver significant extra information to client/user; in contrast, existing schemes require content providers to deliver extra information (e.g., a fingerprinting kit) in addition to the actual content to the user (clients). In phase 2, embodiments of the invention use a novel uniform and format-independent content usage tracking scheme based on the concept of Provable Data Possessions (PDP), sometimes referred to as Proof of Retrievability (POR). A PDP scheme allows a client that has stored data at an untrusted server to verify that the server possesses the original data without retrieving it. This is achieved by the server sending back a Proof of Possession (PoP) to the client each time the client queries. PDP may be used in both the public and conventional key contexts. POR schemes achieve the same functionality and provide additional data retrievability guarantees.

With the present invention, the content to be tracked may be viewed as P's data stored on thousands or millions of superdistribution users. This allows us to construct content identifiers, in the form of PoP, at the user side and allows P to identify content by verifying the validity of the identifier. A client side tracking program is used to do the reporting job. That is, U who is willing to participate in the tracking process allows a client-side tracking program T to compile and report content usage information to P. In some embodiments, incentives may be used to encourage user participation. Along with the usage information, T also sends a PoP of the content being tracked to P and this PoP acts as an identifier of the content. Our assumption here is that the one who owns the content is the one who plays/uses the content. That is, if U can prove that it does own the content, P will believe the usage information from this user is "real" usage information of this content. Note that our use of PoP in the usage tracking context is different from its original application setting. In our context, the verifier of PoP, P, has access to the content while in previous applications, the verifier of PoP, the data client, is assumed not holding a local copy of its data. This difference allows us to simplify the content preparation process so that efficient distribution of data is possible.

In general, embodiments of the invention utilize the interplay among three entities: P, U and T. P is the content provider or content usage tracking server. It prepares content in a desired encoding format and distributes the content through superdistribution. P also serves as the content usage tracking server which collects and processes tracking information received from client-side tracking programs. U is the content user. It acquires its desired content through superdistribution and plays the content in multiple networked computing devices.

The client side tracking program T is a program installed on a user networked computing device. It can be implemented as a kernel extension on any suitable operating systems and can runs as a background process that monitors file-system access, audio/video output buffer, etc. Alternatively T can be implemented as plug-ins that can be integrated with media playback software on major platforms. T can also be implemented as a firmware based software component. At high level, T performs the following two main functionalities: a) compile Usage Tracking Message (UTM); and b) report UTM to P. Other helper functions of T include event detection, network, and/or player dependent handlings.

The following notations are used herein:

D—content. We assume D can be represented as a sequence of n contiguous data blocks: $B[1], \ldots, B[n]$. Blocks may have variable or fixed lengths. For example, a frame in a video can be viewed as a block.

$H(\cdot)$—cryptographic hash function. Standard hash functions include SHA-1, SHA-2, etc.

$g_{key}(\cdot)$—pseudo-random permutation defined as g: $\{0,1\}^l \times \{0,1\}^L \to \{0,1\}^l$. Advanced Encryption Standard (AES) is a good example of pseudo-random permutations.

As described above, in accordance with embodiments of the invention, the first of the three main steps is content preparation and distribution. P prepares D as usual and chooses a unique content ID, cID, for it. All copies of D share the same cID and it is inserted into the header of the media file. For copies on recorded media, P also may choose an anonymous copy ID, aID. A batch of hard copies can share the same aID. The anonymous copy ID, aID, is also put into the header of the media file. For each online distribution, P can either generate an aID dynamically or do nothing. If aID is not provided by P, it can be generated by T later when the content is played for the first time. The use of an anonymous ID for a piece of content in embodiments of the invention enables finer-grained tracking over existing schemes. As described herein, for a piece of content, cID may be used to represent its content ID and aID may be used to represent its anonymous copy ID.

The second main step is usage tracking message generation and reporting. Note that the exact information contained in a UTM depends on what P wants to track. As an example, we may assume P wants to track how many times a distributed copy is played. Below we will show how to generate tracking message for that purpose. To do that, T sends back a UTM every time the content is played. Depending on choice of different implementations, T may respond to the "play content" event either passively or proactively. That is, T can be invoked by the player, or it can run as a background process and continuously detects the happening of the event. In either case, we assume it responds to the event correctly.

T responds to the event by first checking whether an aID exists in the header of content file. For content acquired from a physical medium, an aID field already exists in the header. If there is no such a field, T generates a random value as this copy's anonymous ID: aID. The length of the aID can be set as 128-bit. This is large enough to support 1 billion anonymous users ($2^{30}$). We can safely assume users with different aID as distinct users.

Next T generates an identifier $\sigma_{cID,aID}$ based on the content and its cID and aID. T first uses aID to select m blocks from a total of n blocks of the content and then uses them to generate $\sigma_{cID,aID}$. Since $\sigma_{cID,aID}$ is not only based on the content but also on the anonymous copy ID, it allows P to identify different copies of the media content. Note that the identifier generation algorithm is format independent and thus it can be applied to any media type such as image, audio, video, etc. T generates identifier as follows:

1. First, compute a permutation key pK as:
   pK=H(cID∥aID∥n∥m) where m is the number of blocks selected to construct the identifier.
2. Next, select m block indices:

$\{I_j \in [1, \ldots, N] | 1 \leq j \leq m\}$ where $I_j = g_K(j)$

3. Finally, generate identifier as:

$$\sigma_{cID,aID} = H(cID; aID; B[I_1], \ldots, B[I_m]) \quad (1)$$

Finally T compiles a UTM in the form:

UTM=$(cID; aID; \sigma_{cID,aID}; \text{info})$ where info represents the content usage information collected by T. In our simple example where the number of playing times is being tracked, info is empty. According to different types of information that P wants to get, info may have different contents. The following lists some examples of tracking events that P is interested to track:

Online and Offline Usage. A gaming company may want to learn the online or offline usage of a certain game. More online usage may suggest that people like to play this particular game with others. More offline usage may suggest the opposite. So the gaming company is advised to develop more group games (which require the user to stay online with others) or individual games (which an individual user can play by himself without connecting to the Internet). So T continues running even when the computer device goes offline. It records the number of play times. Once the device connects to the Internet again, T sends back the total number of play times along with original feedback message.

Favorite Advertisement. If the media is encoded into interactive media format such as MPEG4, advertisements can be embedded as individual objects in the content. When a user clicks a piece of advertisement, T records the advertisement object ID and sends a DTM to the content provider. With the advertisement object ID and cID, P may deduce that certain groups of people who like to watch a certain type of content are also interested in particular kinds of products.

Geographical Map. IP addresses can be sent to P as part of the DTM. Also exposure of IP is not usually regarded as a violation of confidentiality. If the same survey message is used when the content is transmitted from one user to another user, the service provider can use the IP information to construct the geographical path to see how contents are distributed and where are the superdistribution center.

Transcoded Media Content. T reads trancoded version information from the media header and sends back this information to the provider. This allows providers to know how many users of a certain content are held-device users, or desk-top users.

Playing Time. T can also be programmed to send back the playing time of users.

The newly generated aID and $\sigma_{cID,aID}$ can be stored in the header of content file or in T's local data area for subsequent use. The choice on where to store aID and $\sigma_{cID,aID}$ can affect tracking statistics when content is re-distributed. When the content is transferred from a user to another user, if aID and $\sigma_{cID,aID}$ are stored in the header of the content file, they are distributed with the content. In this case, the content can be treated as the same copy across multiple users and this set of users on the same distribution path use the same aID as their copy ID; otherwise, every re-distribution of content means the join of a new user in the superdistribution cycle.

The third main step is Usage Tracking Message Verification. P maintains a database to record UTMs. In our example of tracking the number of play times, the schema of the database can be very simple. A tuple contains four attributes: cID, aID, $\sigma_{cID,aID}$ and np where np denotes the number of play times.

Upon receiving a tracking message UTM=(cID,aID, $\sigma_{cID,aID}$) from T, P first checks whether tracking messages on this copy have been received previously. To do so, it looks for an entry containing both cID and aID in its database. If there is no such an entry, P first uses cID to get the content from its content database. Next P computes $\sigma'_{cID,aID}$ according to Equation 1 above. Finally P compares $\sigma_{cID,aID}$ and $\sigma'_{cID,aID}$. If the two values are equal, it means the verification is successful and P inserts a new tuple (aID,cID, $\sigma_{cID,aID}$,1) into its database. If there exists an entry containing cID and aID, P simply compares whether the received $\sigma_{cID,aID}$ equals to the one stored in its database. If they are equal, it updates the entry by increasing np by 1. In case of unsuccessful verification, P simply discards the received tracking message.

Anyone who learns the tuple (cID,aID,$\sigma_{cID,aID}$)—no matter whether it actually possesses the content—can report valid UTMs. Yet another distinguishing aspect of the invention over existing schemes is an embodiment to prevent false reporting and ensure more accurate tracking. In particular, in an embodiment of the invention, we can use a sequence counter as another dimension of input to the permutation key generation function. That is, K is generated as: K=H(cID∥aID∥counter∥n∥m). Different counter values result in different identifier values. A malicious party who does not have the content but wants to do abusive usage reporting (reporting that is much more frequent than normal content usage in order to affect usage statistics) has to pre-compute and store as many identifier values as possible. Even the malicious party does have the content, since it needs to run the identifier generation algorithm every time the content is played, this computation cost may limit abusive reporting activity to some extent. P only needs to store the most recent counter value to keep the current state.

As discussed above, using a sequence counter, an abusive party who stores pre-computed identifiers is still able to compile valid UTMs. To prevent this to happen, P can send a challenge nonce to T and T uses this challenge nonce in the permutation key generation function. That is, K is generated as: K=H(cID∥aID∥nonce∥n∥m). In this way, an abusive party who wants to construct a valid UTM either 1) has to store the content on its storage or 2) pre-computes and stores $2^l$ identifier values where l denotes the size of the challenge nonce in bits. Therefore, using a challenge nonce from P provides the most accurate information guarantee. However, it requires an interaction between P and T to communicate the challenge nonce before each UTM is generated and reported. In practice, we can let P send a new challenge nonce to T after several UTMs from this T have been received. With these embodiments, the present invention is more secure against abusive reporting over prior systems.

The performance of embodiments of the invention may be evaluated in terms of storage and computation overhead on both the user and provider side. Regarding storage overhead, the storage requirement on U's side includes space to install T and space to store content related information such as cID, aID and $\sigma_{cID,aID}$. Since embodiments of the invention are format independent, there is no cost to store a format specific toolkit, such as disclosed in US2008/0288629.

On P's side, it has to maintain a database containing $O(N_p * N_c)$ entries where $N_p$ is the number of copies distributed and $N_c$ is the number of contents P has. However, this is not considered to be a problem because providers would be willing to invest larger disks to accommodate high value information.

Regarding computation overhead, in the basic scheme described above, on the user side, when a content is played for the first time, T needs to compute its identifier $\sigma_{cID,aID}$. In subsequent plays, as T uses the pre-computed and stored $\sigma_{cID,aID}$ to construct UTM, no computation is incurred. On the provider side, when the first UTM over a particular copy and a certain content arrives, the provider needs to compute $\sigma_{cID,aID}$—the same as the first time computation on the user side. For subsequent arrivals of UTMs on the same content copy, P side computation involves a table lookup and corresponding update in the database.

In the above-described advanced scheme, T needs to compute $\sigma_{cID,aID}$ every time the content is played. P conducts the same amount of computation whenever a UTM with a different counter value or a difference challenge value is received.

As seen above, the dominant part of computation cost on both the user and provider side is the computation on $\sigma_{cID,aID}$—a hash operation over selected blocks. The inventors have performed experiments to test the performance of popular hash functions such as MD5 and SHA1 using the OpenSSL library. A 1.73 GHz, 1G memory Dell laptop running on Linux was used to do the experiment. The experiment shows the performance of MD5 is 283 MBytes per second and the performance of SHA1 is 168 MByes per second. Two videos of different sizes were examined, one was a popular 9-minute video from youtube.com and the other is a 2-hour movie. The size of the YouTube video was about 20 MB and the size of the movie with resolution 656×172 was about 500 Mbytes. Therefore, choosing half of the blocks of the movie—250 MBytes, calculation time was less than one second with MD5 and around 1 second with SHA1.

In considering block size, it is noted the hash computation time is dependent on its input size. In our case, the input size is $O(m \cdot L_b)$, where $L_b$ denotes the average size of a content block. A better performance means a smaller m or $L_b$.

Let $P_{suc}$ denote the successful probability that a malicious party manages to pass the verification process. If the party has d blocks of the total n blocks of the content on its disk (in case that the party does not have the content at all, d=0), we have $$P_{suc} = \left(1 - \frac{n-d}{n}\right)^m.$$

That is, the more number of blocks selected, the lower the probability for a malicious party who does not have the content, or has only part of it, to succeed in the verification process. Since a large m is needed to defend against false reporting, we can work on small blocks to achieve better computation performance. Indeed, we do not need to use large blocks in our approach. As we choose the data blocks randomly, a very small data block suffices to limit activity of false reporting.

Figure 2:
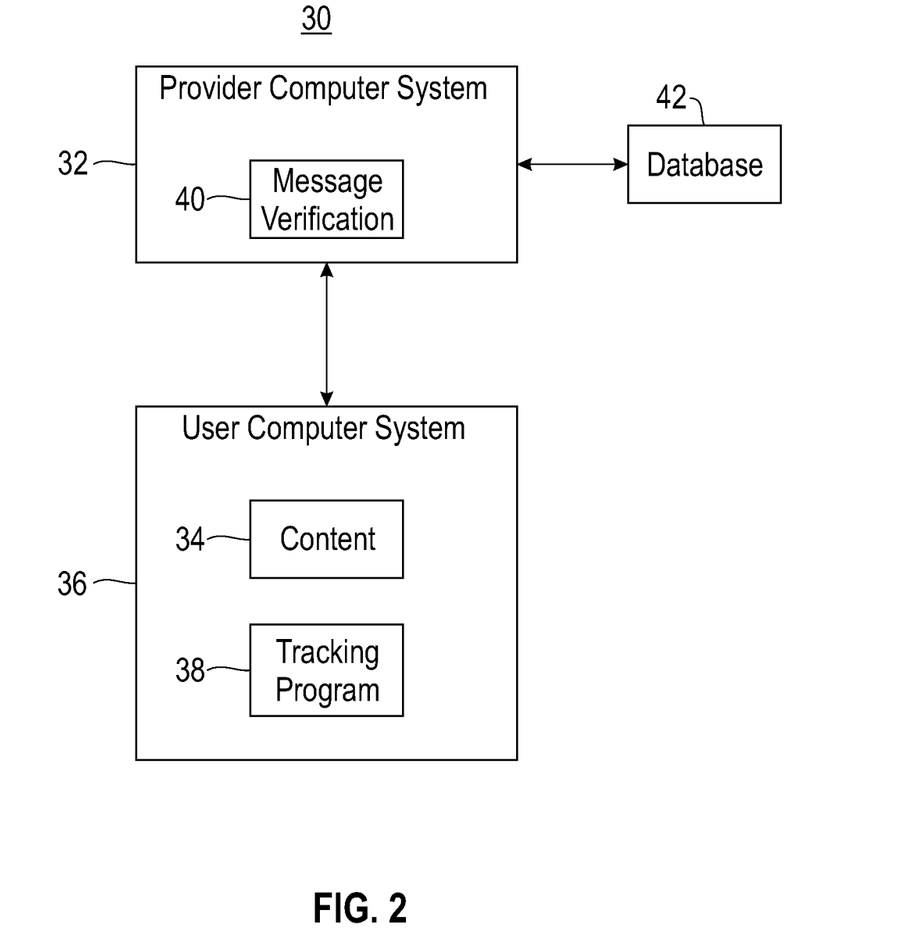
FIG. 2 shows a diagram of a system for the reporting of content usage in accordance with an embodiment of the invention.

FIG. 2 shows a diagram of a system 30 for the reporting of content usage in accordance with an embodiment of the invention. The provider computer system 32 generates digital content 34 and distributes it in accordance with the superdistribution scheme shown in FIG. 1. A user computer system 36, receives and plays the content 34. A tracking program 38 in the user computer system 36 generates a usage tracking message, which is sent to the provider computer system 32, as described above. A message verification component 40 verifies the usage tracking message received from the user computer system 36. The updated usage information is stored in the provider computer system database 42.

Figure 3:
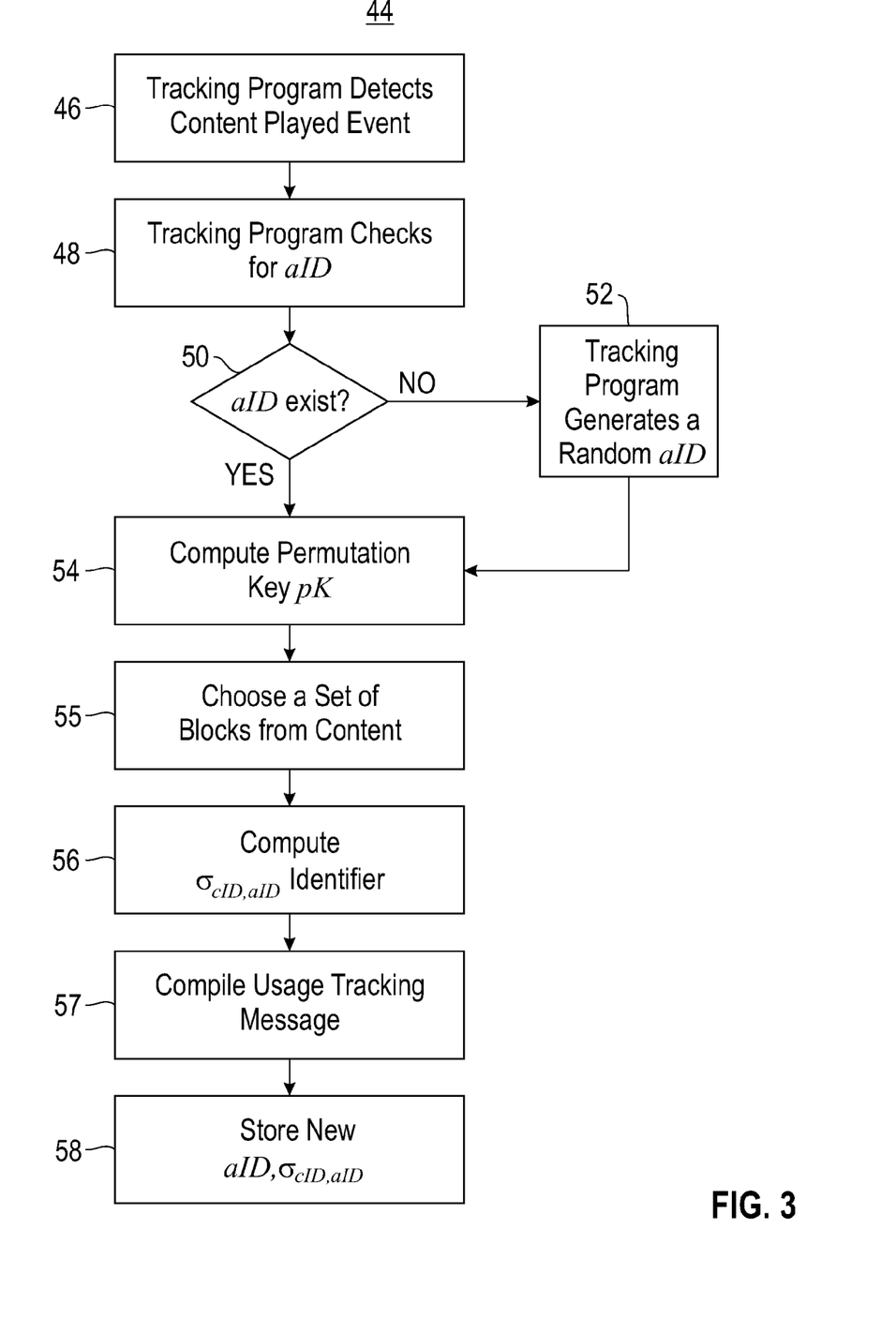
FIG. 3 shows a flow chart of a method for generating a usage tracking message in accordance with an embodiment of the invention.
Figure 4:
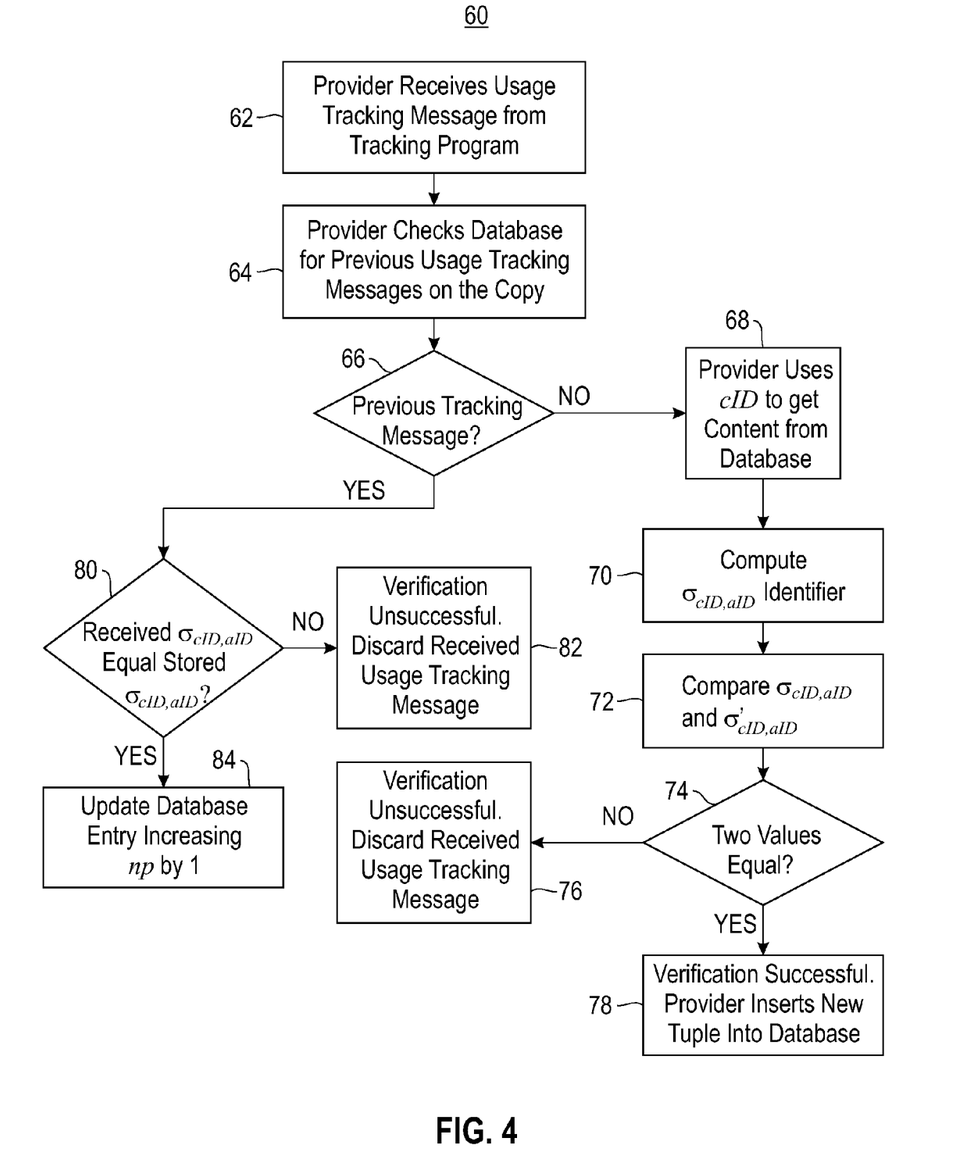
FIG. 4 shows a flow chart of a method for verifying a usage tracking message in accordance with an embodiment of the invention.

FIG. 3 shows a flow chart of a method for generating a usage tracking message in accordance with an embodiment of the invention. As described above, the method 44 uses the tracking program 38 to detect a content played event, in step 46. In step 48, the tracking program checks the content for all aID. Step 50 determines if the is an aID. If not, the tracking program generates a random aID, in step 52 and the process moves to step 54. If step 50 determines that there is an aID, then the process moves directly to step 54. In step 54, the tracking program computes a permutation key, pK, as described above, using the anonymous copy ID and a content ID as seeds. In step 55, the permutation key is used to choose a set of blocks from the content. In step 56, the anonymous ID, content ID and the chosen blocks are used to compute an identifier $\sigma_{cID,aID}$. In step 57, the tracking program 38 compiles usage tracking message. The new aID, $\sigma_{cID,aID}$ is then stored in the header of the content file.

Figure 5:
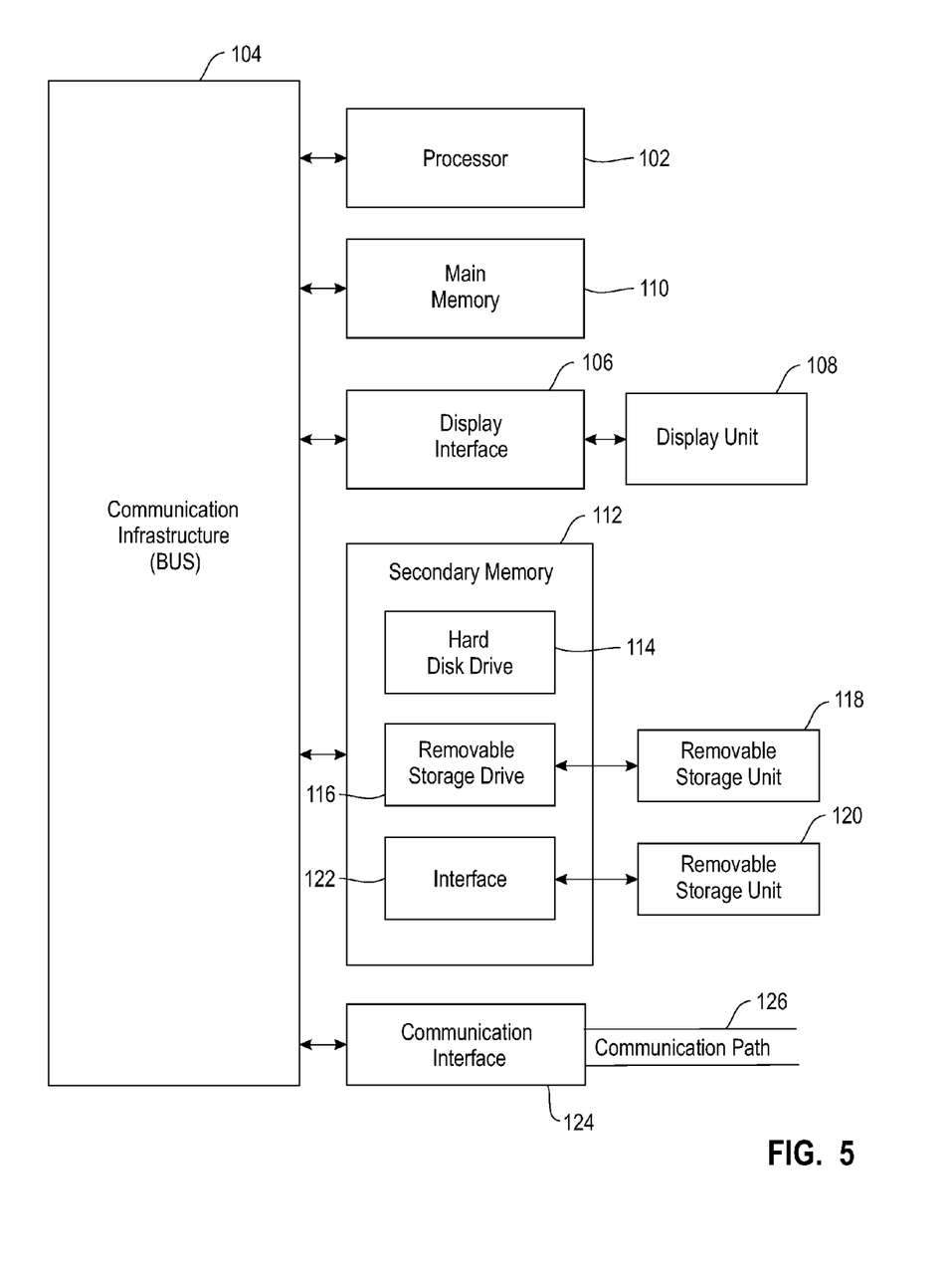
FIG. 5 shows a high level block diagram of an information processing system useful for implementing one embodiment of the present invention.

FIG. 5 shows a flow chart of a method 60 for verifying a usage tracking message in accordance with an embodiment of the invention. In step 62 the provider receives a usage tracking message from the tracking program 38. In step 64 the provider checks the database 42 to see if previous usage tracking messages on the copy already exist in the database. In step 66 the method determines if there is a previous tracking message, and if not, in step 68 the provider uses the cID to get the content from the database 42. In step 70, the provider computes the $\sigma_{cID,aID}$ identifier and then compares it to the received identifier, in step 72. If the two values are not equal, step 76 determines that the verification is not successful and the received usage tracking message is discarded. If the two values are equal, the verification is successful and the provider inserts the new tuple into the database, in step 78.

If in above step 66 there already existed a previous tracking message, step 80 would determine if the received identifier is equal to the stored identifier. If it is not, step 82 discards the received usage tracking message and the verification is unsuccessful. If it is, the provider updates the database entry by increasing np by 1.

As can be seen from the above disclosure, embodiments of the invention provide a content usage tracking system and method in the superdistribution model. Content identifiers are used to track content. The identifier generation algorithm is format independent and therefore it applies to all media formats. The usage tracking scheme is automatic, anonymous and provides fine-grained tracking and accurate tracking information.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction running system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction running system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 5 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when run, enable the computer system to perform the features of the present invention as discussed herein. In particular, the computer programs, when run, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of tracking the usage of at least one digital content comprising:
   preparing the content in an encoded format, the content including a unique content ID in a header of the content;
   distributing the content to a user computer system;
   receiving at least one usage tracking message from the user computer system in response to the usage of the content by the user computer system, the usage tracking message including an identifier based on the unique content ID and an anonymous copy ID; and
   verifying the usage tracking message.

2. The method of claim 1 wherein one usage tracking message may be used to track how many times the content is played by the user computer system.

3. The method of claim 1 wherein the verifying comprises:
   checking if the usage tracking message is stored in a message database;
   if the usage tracking message is not stored in the database, retrieving content corresponding to the usage tracking message from a content database;
   computing a verification value with data in the usage tracking message and data in the retrieved content; and
   if the verification value indicates that the message is verified, updating the message database for the message.

4. A method comprising:
   preparing digital content in an encoded format using a provider computer system, the digital content including a unique content ID in a header of the content;
   distributing the digital content to a user computer system;
   receiving at least one usage tracking message from the user computer system in response to the usage of the content by the user computer system, the usage tracking message including an identifier based on the unique content ID and an anonymous copy ID; and
   verifying the usage tracking message.

5. The method of claim 4 wherein one usage tracking message contains the number of the content is played by the user computer system.

6. A system comprising:
   a provider computer system including a message verification component;
   a user computer system including a content tracking program;
   digital content including a content identifier; and
   wherein the tracking program generates a usage tracking message that reports usage of the digital content by the user computer system and wherein the user computer system sends the usage tracking message to the provider computer system, the usage tracking message including an identifier based on the unique content identifier and an anonymous copy ID.

7. The system according to claim 6 wherein the provider computer system includes a tracking message verifier component that verifies the usage tracking message.

8. The system according to claim 7 further comprising a provider database for storing the usage history for the digital content.

9. A computer program product for tracking the usage of digital content, said computer program product comprising:
   a non-transitory computer readable storage medium having computer readable program code embodied therewith, said computer readable program code comprising:
   computer readable program code configured to:
   prepare digital content in an encoded format using a provider computer system, the digital content including a unique content ID in a header of the content;
   distribute the digital content to a user computer system;
   receive at least one usage tracking message from the user computer system in response to the usage of the content by the user computer system, the usage tracking message including an identifier based on the unique content ID and an anonymous copy ID; and
   verify the usage tracking message.

10. The computer program product according to claim 9 wherein the at least one usage tracking message indicates how many times the content is played by the user computer system.

11. The computer program product according to claim 9 wherein said computer readable program code is further configured to:
  check if the usage tracking message is stored in a message database;
  if the usage tracking message is not stored in the database, retrieving content corresponding to the usage tracking message from a content database;
  computing a verification value with data in the usage tracking message and data in the retrieved content; and
  if the verification value indicates that the message is verified, updating the message database for the message.

12. A method of tracking the usage of at least one digital content comprising:
  receiving the content in an encoded format, the content including a unique content ID in a header of the content;
  generating at least one usage tracking message in response to the usage of the content, the usage tracking message including an identifier based on the unique content ID and an anonymous copy ID;
  reporting the usage tracking message to a provider computer system.

13. The method of claim 12 wherein the generating is a format-independent process.

14. The method of claim 12 wherein one usage tracking message contains the number of the content is played.

15. The method of claim 12 wherein the identifier is generated by a method comprising:
  using the anonymous copy ID and a content ID as seeds to compute a permutation key;
  using the permutation key to choose a set of blocks from the content; and
  using the anonymous ID, content ID and the chosen blocks to compute the identifier.

\* \* \* \* \*